United States Patent

Tyree, Jr.

[15] 3,681,930
[45] Aug. 8, 1972

[54] APPARATUS FOR MAKING CARBON DIOXIDE SNOW

[72] Inventor: Lewis Tyree, Jr., 10401 South Oakley Avenue, Chicago, Ill. 60643

[22] Filed: July 18, 1969

[21] Appl. No.: 843,017

[52] U.S. Cl. .................................... 62/35, 62/10
[51] Int. Cl. ............................................ F25j 1/00
[58] Field of Search ..................... 62/8, 9, 10, 12, 35

[56] References Cited

UNITED STATES PATENTS

| | | | |
|---|---|---|---|
| 1,912,443 | 6/1933 | Goosmann | 62/10 |
| 3,070,967 | 1/1963 | Uren | 62/35 |
| 3,443,389 | 5/1969 | Townsend | 62/10 |
| 1,546,682 | 7/1925 | Slate | 62/35 |
| 1,795,772 | 3/1931 | Goosmann | 62/35 |
| 3,492,829 | 2/1970 | Stanford | 62/10 |
| 2,080,300 | 5/1937 | Belt | 62/10 |
| 2,011,550 | 8/1935 | Hasche | 62/10 |

*Primary Examiner*—Norman Yudkoff
*Assistant Examiner*—Arthur F. Purcell
*Attorney*—Anderson, Luedeka, Fitch, Even and Tabin

[57] ABSTRACT

Carbon dioxide snow is produced by expansion of liquid $CO_2$ through a nozzle near the upper end of a hollow column so the snow travels downward along a spiral path adjacent the column inner wall while gas exits upward through an outlet at the top. A tubular baffle surrounds the upper outlet, and the snow is intermittently removed from the bottom. The cold $CO_2$ gas leaving the column flows in heat-exchange relationship first with the incoming liquid and then with hot gaseous $CO_2$ leaving a compressor toward which the cold gas flows. The gaseous $CO_2$ is compressed and condensed by a freon refrigeration unit while the pressure is held above 280 psig.

7 Claims, 3 Drawing Figures

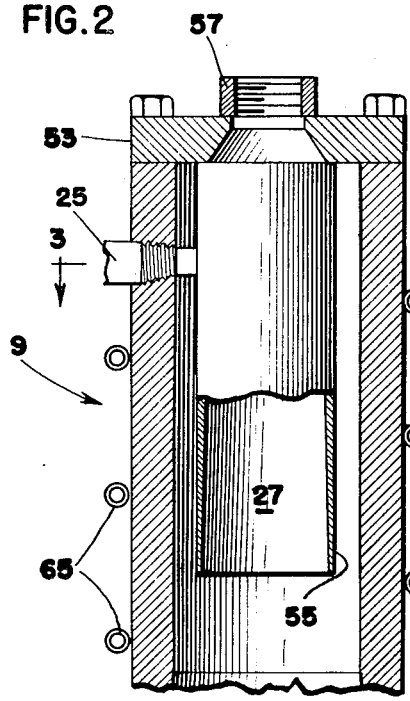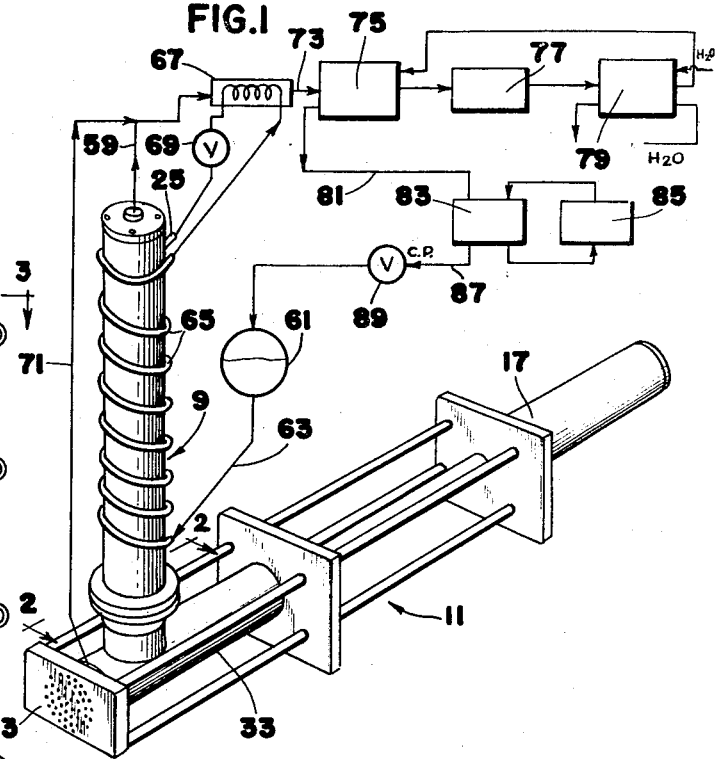
PATENTED AUG 8 1972 3,681,930
FIG. 2
FIG. 1
FIG. 3
INVENTOR
LEWIS TYREE JR.
ATTYS.

APPARATUS FOR MAKING CARBON DIOXIDE SNOW

This invention relates to the production of solid carbon dioxide and, more particularly, to a process for the production of solid carbon dioxide snow and to apparatus for performing such a process.

Carbon dioxide snow is employed as an intermediate in the production of large blocks of solid carbon dioxide which are subsequently used for refrigeration and other purposes. In an apparatus for the production of blocks of solid carbon dioxide, liquid carbon dioxide is flashed to a mixture of gaseous carbon dioxide and snow, and the snow is generally compressed by a ram to blocks or the like of solid carbon dioxide. Oftentimes the production output of such an apparatus is dependent upon the supply of a sufficient amount of carbon dioxide snow to the ram. The capacity of the snow-making portion of the apparatus cannot be arbitrarily increased by merely increasing the flow rate of the liquid carbon dioxide because incomplete separation of the gaseous dioxide and the snow would likely occur, resulting in economically inefficient operation.

It is an object of the present invention to provide an improved process for making solid carbon dioxide snow and to provide apparatus for performing such a process. Another object of the invention is to efficiently and economically produce carbon dioxide snow from liquid carbon dioxide under superatmospheric pressure. A further object is to provide apparatus for the production of carbon dioxide snow that effects very efficient separation of the snow from the gas in the mixture formed upon expansion of the liquid carbon dioxide. Still another object is to provide apparatus for continuously producing snow for feeding to a device which accepts snow only intermittently. A still further object is to provide a process for the dependable supply of carbon dioxide snow to a device which accepts snow only intermittently.

These and other objects of the invention should be apparent from a reading of the following detailed description of one illustrative apparatus embodying various features of the invention, in conjunction with the accompanying drawings wherein:

FIG. 1 is a fragmentary perspective view of apparatus for the production of carbon dioxide snow embodying various of the features of the invention, which view includes a diagrammatic representation of the auxiliary equipment included with such an operating apparatus;

FIG. 2 is an enlarged vertical sectional view of the apparatus taken generally along line 2—2 of FIG. 1; and FIG. 3 is a horizontal sectional view taken along line 3—3 of FIG. 2.

A snow tower 9 is illustrated as a part of an extrusion apparatus 11, which is designed for automatic, semicontinuous extrusion of a plurality of rods of dense carbon dioxide through apertures in an extrusion die 13 using a ram 15. The ram 15 is driven by a suitable hydraulic drive unit 17 via a power transmission rod 18. In FIG. 2, the ram is shown in its retracted position in an extrusion cylinder or chamber 19 of circular cross section wherein it reciprocates. In this position, the ram 15 opens an entrance 21 to the extrusion chamber 19 from the upstanding snow tower 9.

In the snow tower 9, liquid carbon dioxide under superatmospheric pressure is flashed to form a mixture of carbon dioxide snow and gaseous carbon dioxide by expansion through a nozzle 25. The snow falls to the bottom of the snow tower 9 where it accumulates upon the exposed surface of the ram until the ram is retracted, at which time the snow falls through the entrance 21 into the extrusion chamber 19 to be compressed by the ram on its next power stroke. The smoothness, trueness and the downward flaring configuration of the inner wall of the snow tower 9, along with the warming of the wall, assures the dependable release of the snow by the force of gravity, as discussed in detail hereinafter.

It has been found that by the proper design of the snow tower, very efficient separation of the snow from the gas flashing from the nozzle 25 is obtained. This efficient separation allows a snow tower 9 of relatively small volume to be employed to supply an extrusion apparatus 11 that requires a relatively large supply of carbon dioxide snow to achieve its design output of dense solid carbon dioxide. This feature is also considered especially important in supplying snow to a device which accepts it intermittently.

It has been found that, by designing the snow tower 9 so that the gas is continuously removed from an end thereof opposite from the end from which the snow is intermittently removed, an effective separation of gas from snow can be achieved within the tower while snow is being supplied to a device which accepts it only intermittently. Moreover, by disposing the nozzle 25 so that the snow is directed against the inner arcuate surface of a generally vertically disposed tower wall having a generally circular cross section, a centrifugal effect is created which enhances the separation of the carbon dioxide snow from the gaseous carbon dioxide. In the illustrated apparatus, the snow follows a generally spiral outer path downward along the wall to the bottom of the tower while the gas is forced into the axial center of the tower where it exits via a central outlet or passageway 27 in the upper end of the tower. The substantially complete separation of snow from the gas, combined with other features of the relique-faction section (discussed hereinafter), provide an economical and efficient overall snow-making system.

Now referring more specifically to the details of the drawings, the extrusion chamber 19 is defined by a main horizontal tubular body 33 of circular cross section wherein the ram 15 reciprocates. The upper circular entrance 21 to the extrusion chamber 19 is defined by an upstanding collar support section 35 having a circular flange 37 at its upper end. The extrusion die 13 is suitably supported at the forward end of the extrusion chamber 19.

The snow tower section 9 comprises a generally tubular column 45 which is designed to fit downward into the collar support section 35 and terminate very closely adjacent the upper surface of the ram 15 at the location of the upper entrance 21 to the extrusion chamber 19. The interior of the tubular column 45 serves as the chamber wherein the snow is created by the expansion of the pressurized liquid. Carbon dioxide snow has a tendency to bridge, and bridging can result in blockage of the bottom end of the column 45 which may require shutdown of the apparatus to manually remove the blockage. In the illustrated apparatus a number of steps are taken to prevent such a blockage from disrupting the supply of snow to the extrusion cylinder 19. The upper portion of the column 45 in the region of the nozzle 25 is of constant diameter; however, the lower portion is formed with a frustoconical inner surface 46 of downward-increasing diameter to serve as a snow accumulation section. The entire inner surface of the column 45 should be smooth and true, and it is preferably made by machining, as opposed to being made of rolled metal. The smoothness and trueness reduces the tendency of snow to adhere thereto during the time it accumulates while awaiting the retraction of the ram 15.

The outlet at the bottom of the tubular column 45 is defined by the bottom edge 47 thereof, and the edge 47 is contoured to the upper surface of the ram 15. The sidewalls of the horizontal tubular body 33, which defines the extrusion cylinder 19, are formed with a slight bulge just below the collar support section 35 to accommodate the depending portions of the lower end of the column 45 which extend downward thereinto and flank the ram. Subject to manufacturing and assembly tolerances, the lower edge 47 of the column is substantially located at what would be the intersection between the column 45 and the extension of the inner wall of the extrusion cylinder. As is shown in FIG. 2, the diameter of the lower end of the inner frustoconical surface 46 of the accumulation section of the column is less than the diameter of the extrusion cylinder. This is another feature which opposes the bridging tendency of the snow by removing any support surface upon which snow could readily adhere at the junction therebetween. Furthermore, because the lower edge 47 of the column is contoured very closely to the shape of the ram, the tendency is minimized for snow to pack between the lower end of the column and the support collar section 35 (during the time the ram is in the extended position) and thus provide a support point from which a potential snow bridge could be formed across the bottom of the snow tower. Moreover, as is described hereinafter, the accumulation portion of the column 45 is warmed to provide a positive measure against the adherence of briding snow to the inner frustoconical surface 46.

A peripheral recess in the outer surface of the column 45 accommodates a split ring 48 which seats in a suitable circular recess provided in the upper surface of the upper flange portion 37 of the collar support section 35. The column 45 is clamped in this location by a hold-down ring 49 which contains a recess in its undersurface that receives the upper circumferential edge of the split ring 48. Aligned holes in the hold-down ring 49 and the upper flange portion 37 of the collar support section facilitate the attachment of the ring via nuts and bolts, and a suitable annular gasket is provided therebetween. The outer surface of the column 45 is also provided with a pair of peripheral recesses which accommodate 0-rings 51 that provide a seal between the outer surface of the column and the inner surface of the collar support section 35.

The upper end of the column 45 is partially closed by a cap plate 53 which carries a depending generally tubular member or baffle 55 leading upward to a central aperture in the cap plate which serves as the gas outlet passageway 27 from the snow tower. The exterior surface of the baffle 55 defines an annular region with the upper portion of the inner wall of the column 45. The cap plate 53 is suitably attached by a plurality of bolts which extend downward into the upper end of the column 45. An upstanding internally threaded coupling 57, which is suitably attached to the upper surface of the cap plate 53, as by welding, provides a connection between the outlet 27 at the top of the snow tower 23 and a gas return conduit 59.

As best seen in FIG. 3, the nozzle 25 enters the column 45 in the annular region disposed in a nonradial direction, which is preferably generally tangential to the inner wall, so that the snow which is created is directed fairly smoothly against the inner wall of the column 45. The end of the nozzle 25 preferably terminates diagonally, at about a 45° angle to the direction of fluid flow therethrough, and thus presents a fairly smooth transition with the inner wall of the column 45 through which it protrudes very slightly. The orientation of the nozzle is such to create a clockwise (when viewed looking downward as in FIG. 3.) spiral flow of snow along a path adjacent the inner wall. For best performance, at a rate of liquid flow of 3,000 pounds per hour of $CO_2$ at 0° F. and 300 psig., the inner diameter of the column 45 at the horizontal location of the nozzle should be at least about 7 inches and the annular region should have a width of at least about an inch. However, these criteria may change slightly with variance in the rate of flow and the pressure and temperature of the liquid.

The injection or spraying of this mixture of carbon dioxide snow and gas in a nonradial direction into the annular region formed between the outer surface of the baffle 55 and the inner wall of the column 45 creates a centrifugal separation effect, with the heavier solid snow tending to travel in a downward spiral direction along the column wall while the gaseous carbon dioxide is forced into the central region where the tubular member 55 is located. By the time the snow particles reach the lower end of the annular region, the separation should be quite complete so that no significant amount of snow is carried up through the outlet passageway 27 with the gas. To assure the completeness of this separation when operating at expansion rates of 2,500 or more pounds of $CO_2$ per hour, the distance from the nozzle 25 to the bottom of the tubular baffle 55 should preferably be greater than the inner diameter of the column 45 at this region and the velocity of the gas entering the opening at the bottom of the baffle should not be greater than about 15 feet per second. Moreover, the baffle 55 is preferably tapered, for example about one-half degree, both inside and outside to obviate the possibility that snow might bridge interiorly or exteriorly of the baffle.

In one embodiment of a snow tower 9 wherein such a downward spiral movement of the snow along the inner wall is created, an excellent separation of snow and gas is achieved and substantially all of the snow which is formed gravitates to the bottom of the column. In this embodiment, the column has an inner diameter at the annular region of 7 inches and the cross sectional area of the opening at the bottom is about 12 square inches. At a flow rate of about 3,000 pounds of liquid $CO_2$ an hour, the velocity of the gas entering the opening in the baffle 55 is about 10 feet per second. As a result of achieving such an effective separation, the nozzle 25 can be efficiently operated at a high capacity for a tower of this relative size, whereas operation at comparable liquid flow rates without achieving such an effective separation would result in substantial amounts of the snow being carried out with the return gas stream so that the overall operation would become uneconomical in this respect.

As an example, operating with a snow tower 9 about 4 feet high having an inner diameter measuring 7 inches at its top and 7½ inches at the bottom, it has been found that liquid carbon dioxide from a storage vessel at about 0° F. and 280 psig. can be continuously supplied at a rate of about 3,200 pounds per hour and that solid carbon dioxide snow in an amount of more than 97 percent of that theoretically available is obtained. This performance is considered excellent for a snow-making device of this size operating under these conditions.

In the operation of the extrusion apparatus 11, liquid carbon dioxide from a storage vessel 61, where it is usually maintained at a pressure between about 220 and 300 psig., is fed to the nozzle 25 through a feed line 63. If there is a considerable distance between the storage vessel 61 and the extrusion apparatus, a pump may be included in the line 63. The incoming liquid is subcooled as the feed line 63 connects to a spiral coil of tubing 65 which is in heat exchange contact with the outer surface of the column 45 of the snow tower 23. The column 45, or at least the lower portion thereof which serves as the accumulation section, is made from a material having a thermal conductivity at least about equal to that of brass and is preferably made of aluminum. The passage of the relatively warm liquid through this spiral coil 65, while slightly subcooling the liquid, more importantly warms the column 45. This warming effect provides a positive measure against the adherence of the cold snow to the inner surface 46 where it might create a potential blockage.

The liquid leaving the coil 65 flows through a heat exchanger 67 where a portion of the cooling potential of the cold gas leaving the extrusion apparatus 11 is utilized to further subcool the liquid. If desired, liquid may be passed through the heat exchanger 67 before it flows through the coil 65. From the heat exchanger 67, the liquid passes through a valve 69 which leads to the nozzle 25. The valve 69 is used to set the desired flow rate of liquid to the expansion nozzle 25 through which it is sprayed to create cold carbon dioxide gas and snow at the rate required by the underlying extrusion chamber and ram. The valve 69 may be controlled by a pilot line which reads the pressure in the column or the inlet pressure at a compressor 77. Alternatively, other flow controlling devices, such as an orifice, might be employed.

The gas exiting from the upper end of the column 45 merges with gas flowing in a line 71 leading from the extrusion chamber 19 at a region just rearward of the extrusion die 13 where some carbon dioxide gas may be liberated from the snow during the compressive action of the ram 15 on the snow charge in the extrusion cylinder. The combined cold gas streams pass through the heat exchanger 67 and pick up some heat from the liquid as it is subcooled. The cold gas from the heat exchanger 67 travels through a conduit 73 and through another heat exchanger 75 on its way to the compressor 77. The cold gas leaving the heat exchanger 75 is at a pressure of about 30-40 psig., and the compressor 77 raises the pressure to slightly above 300 psig.

The gas picks up a considerable amount of heat in the compressor 77, and it travels first through a water-cooled heat exchanger 79 on its way back to the heat exchanger 75 wherein it gives up more of its sensible heat to the low pressure cold gas stream flowing toward the compressor 77. The high pressure gas exiting from the heat exchanger 75 flows through a conduit 81 to a condenser 83 which is cooled by a refrigeration unit 85 using a freon refrigerant. Freons are polyhalogenated derivatives of methane and ethane containing fluorine and, in most cases, chlorine or bromine. Monochlorodifluormethane (Freon-22) is one of the freons most commonly used. Refrigeration units of this type are commercially available.

The condenser operation is controlled so that the gas is substantially entirely condensed to liquid before reaching a return line 87 leading to the storage vessel 61. A pressure regulating valve 89 in the return line 87 maintains a pressure of at least about 280 psig. and preferably at least about 300 psig. in the line 87. It has been found that the freon refrigeration unit functions far more efficiently if the system is operated at a pressure of at least about 280 psig. Most large $CO_2$ storage vessel systems operate at a pressure varying from about 240 to 280 psig., depending on supply conditions and local climate. However, pressures are not usually found above about 300 psig. Because the pressure within the usual storage vessel 61 does not normally exceed about 280 psig., it is not considered economical to design the overall plant to function at significantly higher pressures.

The pressure within the condenser 83 is preferably maintained at a value of about 300 psig. by the installation of the pressure-regulating valve 89 in the return line 87. The valve 89 reads the pressure in the condenser 89 via a pilot line (not shown). By operating the condenser 89 at such an elevated pressure, somewhat less heat need be withdrawn from the compressed gas because the change to the liquid phase takes place at a higher temperature than it would if the pressure in the condenser were at 240 psig. or 220 psig. for example. More importantly, this facilitates greatly more efficient operation of the refrigeration unit 85 utilizing the joule-thomson expansion of freon refrigerant because such units operate progressively and increasingly less efficiently at progressively lower temperatures, for example, below about −10° F. where isenthalpic (joule-thomson) expansion departs more and more from isentropic (perfect) expansion. At a pressure of about 300 psig. gaseous carbon dioxide undergoes a change to the liquid phase at a temperature of +2° F. (−16.7° C) and at 280 psig., at a temperature of −2° F. (−19° C.), whereas at a lower pressure of, for example, 220 psig., it must be cooled to −18° F. (−27° C) before the change to the liquid phase occurs. It should be appreciated that achievement of the temperature differential between −2° F. and −18° F. is accomplished by such a freon refrigeration unit only with a great loss in efficiency.

The liquid flowing through the valve 89 in the return line 87 enters the storage vessel 61, preferably at a location above the liquid level therein. The liquid carbon dioxide in the insulated storage vessel 61 is usually maintained at a pressure between about 280 psig. and about 220 psig. If it goes higher, a self-contained system (not shown) associated with the storage vessel 61 supplys refrigeration. The vessel may alternatively be cooled by evaporation by venting some gaseous $CO_2$ to atmosphere.

In summary, the overall arrangement provides for the very efficient production of carbon dioxide snow at a high rate in a chamber of relatively limited size. By minimizing the amount of snow which is entrained in the exiting gas stream, particularly as a result of the centrifugal separation effect, the efficiency of the snow-making equipment is substantially enhanced. The downward taper of the inner wall of the hollow column also adds to this effect, and the warming of the heat-conductive column inner wall assures the release of the snow. This is considered particularly important in the instance where there is not continuous removal of the snow from the tower but where there is an intermittent accumulation of snow at the bottom of the tower, as during the time the entrance 21 is closed by the location of the ram. However, the operation is not limited to intermittently feeding a ram, as an extrusion screw may be employed if less dense carbon dioxide is desired. Using such a screw, the snow will accumulate in the column until it can fall into the open space between the lands. Furthermore, the operation of the condenser 83 at a fairly high pressure assures the efficient utilization of freon refrigeration units using joule-thomson expansion, which coupled with the foregoing efficiency in recovering substantially all of the snow produced results in a very economical process overall.

Various of the features of the invention are set forth in the following claims.

What is claimed is:

1. Apparatus for the production of carbon dioxide snow, which apparatus comprises a generally vertically extending hollow column, a gas exit passageway in the upper portion of said column, a gas return conduit in fluid communication with said exit passageway, nozzle means in said column in the upper portion thereof, means for supplying liquid carbon dioxide under superatmospheric pressure to said nozzle means wherein it is expanded to a mixture of snow and gas, said column including a lower accumulation section having an inner wall in the shape of a frustum of a cone with the diameter at the bottom being larger than the diameter at the top into which section the snow falls while the gas exits upward thereof, said lower accumulation section of said column being made of a material having a thermal conductivity at least about equal to that of brass, liquid conduit means in which said liquid carbon dioxide flows in traveling to said nozzle means being disposed in heat-conducting contact with the outer surface of said lower accumulation section and thereby warming said accumulation section, means to receive $CO_2$ snow at the bottom of said column for intermittently removing said snow therefrom including a ram which moves in a cylinder which is circular in cross section and extends horizontally at the lower end of said column, said inner wall portion of said column terminating in an arcuately contoured edge extending from a point at the upper extremity of said cylinder to a point below and approximating the intersection of said cylinder and said inner wall, and a supporting flange integral with said supporting cylinder and surrounding the lower extremity of said column for securing said column to said cylinder, said cylinder having a diameter greater than the diameter of the lower end of said column, whereby the bridging tendency of carbon dioxide snow is opposed.

2. Apparatus in accordance with claim 1 wherein a tubular baffle is disposed at the top of said hollow column which column is circular in cross-section, said baffle being located coaxial with the circular hollow column, said gas exit passageway being disposed at the upper end of said baffle, and the diameter of said baffle being greater than one-half the inner diameter of said upper portion of said hollow column.

3. Apparatus in accordance with claim 2 wherein the cross sectional area of the entrance to said exit passageway at the bottom of said baffle is of sufficient size so that the gas entering has a velocity not greater than about 15 feet per second.

4. Apparatus in accordance with claim 3 wherein said entrance to said exit passageway has a cross-sectional area of at least about 8 sq. in.

5. Apparatus in accordance with claim 2 wherein the vertical distance between said nozzle and the lower end of said baffle is at least equal to the inner diameter of said column.

6. Apparatus in accordance with claim 2 wherein the interior wall of said entire column below said nozzle means has the shape of a frustum of a cone and wherein said tubular baffle also has an exterior surface of downwardly decreasing diameter.

7. Apparatus in accordance with claim 1 wherein heat exchange means is provided which is connected on one side to said gas return conduit and is connected on the other side between the discharge from said liquid conduit means and said supply means leading to said nozzle means, whereby heat exchange between the gas and liquid is effected.

* * * * *